United States Patent
Cui (10) Patent No.: US 9,544,784 B2
(45) Date of Patent: Jan. 10, 2017

(54) MOBILE TERMINAL AND METHOD OF DISPLAYING ACCORDING TO ENVIRONMENTAL DATA

(75) Inventor: Chenfu Cui, Shenzhen (CN)

(73) Assignee: Yulong Computer Telecommunication Scientific (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 14/131,663

(22) PCT Filed: Nov. 11, 2011

(86) PCT No.: PCT/CN2011/082088
§ 371 (c)(1),
(2), (4) Date: Mar. 6, 2014

(87) PCT Pub. No.: WO2013/020333
PCT Pub. Date: Feb. 14, 2013

(65) Prior Publication Data
US 2014/0187226 A1    Jul. 3, 2014

(30) Foreign Application Priority Data

Aug. 5, 2011   (CN) .......................... 2011 1 0223630

(51) Int. Cl.
*H04M 1/725* (2006.01)
*H04W 24/02* (2009.01)
(Continued)

(52) U.S. Cl.
CPC ............ *H04W 24/02* (2013.01); *G06F 1/1694* (2013.01); *G06F 3/0487* (2013.01); *H04M 1/663* (2013.01);
(Continued)

(58) Field of Classification Search
CPC  H04M 2250/22; H04M 1/67; H04M 1/72583; H04M 1/663; H04M 2250/12; H04M 2250/16; H04M 1/0245; H04M 1/6041; H04M 1/66; H04M 1/72519; H04M 1/0202; H04M 1/673; H04M 1/0214; H04M 1/0235; H04M 1/0237; H04M 1/0241; H04M 1/236; H04M 1/575; G06F 21/629; G06F 2200/1614; G06F 2200/1636; G06F 2203/04806; G06F 3/011; G06F 3/0304; G06F 3/03; G06F 3/038; G06F 3/041; G06F 3/0414; G06F 3/04842; G06F 3/04847; G06F 3/0486; G06F 3/0487; G06F 3/04883; G06F 3/167; H04W 52/027; H04W 52/0254; H04W 24/02; H04W 52/0225; H04W 52/0258; Y02B 60/1289
See application file for complete search history.

(56) References Cited

U.S. PATENT DOCUMENTS 5,881,377 A * 3/1999 Giel .................... H04M 1/0202
340/7.32
7,793,225 B2 * 9/2010 Anzures .................. G06F 3/017
345/173
(Continued)

FOREIGN PATENT DOCUMENTS

CN     1725768 A    1/2006
CN   101741985 A    6/2010
(Continued)

OTHER PUBLICATIONS

Okada et al., Informaoin Processing Device, May 6, 2010, Google Translation, WO2010050154 A1, retrieved Feb. 10, 2016.*

*Primary Examiner* — Matthew Sams
(74) *Attorney, Agent, or Firm* — Bret E. Field; Bozicevic, Field & Francis LLP (57) ABSTRACT

The present invention provides a mobile terminal, comprising: a detection module for detecting the environment that
(Continued)

the mobile terminal is in; and a display module for displaying corresponding control buttons according to detected environmental data. Accordingly, the present invention also provides a method of displaying according to environmental data. The technical solution of the present invention can effectively avoid users' misoperation of an incoming call and the like when the mobile terminal is put in a pocket or bag.

18 Claims, 4 Drawing Sheets

(51) Int. Cl.
    *G06F 3/0487*      (2013.01)
    *G06F 1/16*      (2006.01)
    *H04M 1/663*      (2006.01)

(52) U.S. Cl.
    CPC ..... *H04M 1/72583* (2013.01); *H04M 1/72597* (2013.01); *H04M 2250/12* (2013.01)

(56) References Cited

U.S. PATENT DOCUMENTS

| | | | | |
|---|---|---|---|---|
| 2001/0044318 A1* | 11/2001 | Mantyjarvi | .......... | H03K 17/962 455/550.1 |
| 2007/0002016 A1* | 1/2007 | Cho | .......... | G06F 1/1626 345/157 |
| 2008/0070648 A1* | 3/2008 | Kang | .......... | H04M 1/0214 455/575.3 |
| 2009/0262078 A1* | 10/2009 | Pizzi | .......... | 345/169 |
| 2010/0120478 A1* | 5/2010 | Nomura | .......... | H04M 1/0241 455/575.4 |
| 2010/0138680 A1* | 6/2010 | Brisebois | .......... | G06F 1/1626 713/324 |
| 2010/0269040 A1* | 10/2010 | Lee | .......... | 715/702 |
| 2010/0283735 A1* | 11/2010 | Kim | .......... | G06F 3/0488 345/168 |
| 2010/0317332 A1* | 12/2010 | Bathiche | .......... | H04L 12/282 455/418 |
| 2011/0081889 A1* | 4/2011 | Gao | .......... | G06F 3/038 455/411 |
| 2011/0201301 A1* | 8/2011 | Okada | .......... | G06F 3/0416 455/404.1 |
| 2012/0075212 A1* | 3/2012 | Park | .......... | G06F 3/04886 345/173 |
| 2012/0270605 A1* | 10/2012 | Garrone | .......... | H04M 1/72563 455/566 |
| 2013/0053105 A1* | 2/2013 | Lee | .......... | H04M 1/673 455/565 |
| 2014/0157210 A1* | 6/2014 | Katz | .......... | G06F 3/017 715/863 |
| 2014/0187226 A1* | 7/2014 | Cui | .......... | G06F 3/0487 455/418 |

FOREIGN PATENT DOCUMENTS

| | | | | |
|---|---|---|---|---|
| CN | 102238287 A | | 11/2011 | |
| GB | EP 1 109 382 A2 * | | 6/2001 | .......... H04M 1/725 |
| JP | 2003219201 A * | | 7/2003 | |
| JP | WO 2010050154 A1 * | | 5/2010 | .......... G06F 3/0416 |

* cited by examiner

MOBILE TERMINAL AND METHOD OF DISPLAYING ACCORDING TO ENVIRONMENTAL DATA

FIELD OF THE INVENTION

The present invention relates to the field of mobile communication, and specifically, to a mobile terminal and a method of displaying according to environmental data.

BACKGROUND OF THE INVENTION

Figure 4:
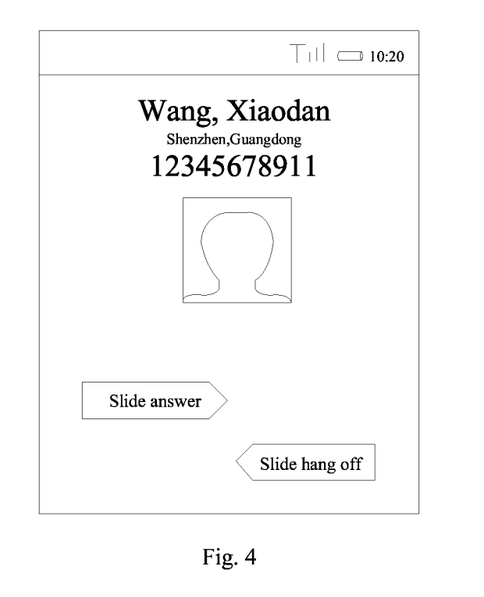
FIG. 4 is a schematic diagram of the display interface of an incoming call of a mobile phone in a screen locked state in the related art.
Figure 5:
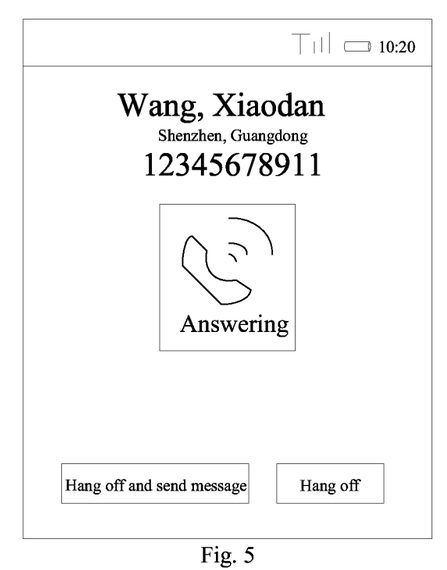
FIG. 5 is a schematic diagram of the display interface of an incoming call of a mobile phone in a screen unlocked state in the related art.

In related art, when a mobile phone in a state that its screen is locked receives an incoming call, the display interface is shown in FIG. 4, which displays incoming call information (the caller named Wang Xiaodan and the caller's number) and control buttons (a slide answer button and a slide hang off button), and a user answers the call through a slide answer control button and refuses the call through a slide hang off control button. When a mobile phone in a state that the screen is not locked receives an incoming call, the display interface is shown in FIG. 5, which displays incoming call information (the caller named Wang Xiaodan and the caller's number) and control buttons (an answer button, a hang off and send message button, and a hang off button). Touch screen mobile phones bring people more convenient operation experiences while still have some problems due to imperfections in design and etc. For example, answering or hanging off an incoming call with a touch screen mobile phone is usually conducted by ways of touching, sliding or etc., and when a user does not need to use the mobile phone, it is usually put into a bag or pocket, then if an incoming call is received in this situation, misoperation easily occurs, for example, the user hangs off the call through the slide hang off button unintentionally, and for further example, the mobile phone in the bag is unlocked due to misoperation, then the number of a contact person is dialed or some applications are initiated, this brings unnecessary trouble and loss to the user.

Therefore, a display technology is desired to avoid misoperation and improve users' experience.

SUMMARY OF THE INVENTION

Based on the above problems, the present invention provides a new mobile terminal and a displaying method, which can judge whether the mobile terminal is in a state that it is handheld by a user, avoid misoperation in situations such as incoming call and improve users' experience through some technical means.

The mobile terminal according to the present invention can comprise: a detection module for detecting the environment that the mobile terminal is in; and a display module for displaying corresponding control buttons according to detected environmental data. In this technical solution, the detection module detects and judges the environments of the mobile terminal, and then the display module displays corresponding control buttons according to different environments, thus avoiding users' misoperation.

In the above technical solution, preferably, the detection module is specifically a sensor which comprises at least one of: a photosensitive sensor, a temperature sensor, and a distance measuring sensor. In this technical solution, the sensor in the mobile terminal can comprises one or more than one of the photosensitive sensor, the temperature sensor, the distance measuring sensor and any other sensor that can be used for the detection of the environment of the mobile terminal.

In the above technical solution, preferably, in the case that the environment of the mobile terminal detected by the detection module is that the mobile terminal is handheld by a user, when the mobile terminal receives a call, operation buttons are displayed, and in this situation, the user can conduct any operations such as answering or hanging off the call, without being limited; in the case that the environment of the mobile terminal detected by the detection module is that the mobile terminal is not handheld by a user, when the mobile terminal receives a call, information of the incoming call is displayed and the operation buttons are not displayed, in this situation, the user can see the information of the incoming call at the screen of the mobile terminal, while cannot conduct any operations such as answering or hanging off the call that may affect the incoming call. In this technical solution, the detection module detects and judges whether the mobile terminal is handheld by the user, and by way of limiting the operation buttons, the user is prevented from misoperating the mobile terminal when the mobile terminal is not handheld by the user.

In the above technical solution, preferably, in the case that the environment of the mobile terminal detected by the detection module is that the mobile terminal is handheld by a user, the unlock button is displayed after the screen of the mobile terminal is locked, in this situation, the user can unlock the mobile terminal or conduct any further operation without being limited; in the case that the environment of the mobile terminal detected by the detection module is that the mobile terminal is not handheld by a user, the unlock button is not displayed after the screen of the mobile terminal is locked, in this situation, the user cannot unlock the mobile terminal or conduct any further operation to avoid misoperation. In this technical solution, the detection module detects and judges whether the mobile terminal is handheld by the user, and by way of limiting the operation buttons, the user is prevented from misoperating the mobile terminal when the mobile terminal is not handheld by the user.

In the above technical solution, preferably, the mobile terminal may comprise a touch screen mobile phone, a touch screen tablet computer and etc.

In the above technical solution, preferably, the environmental data comprises temperature, light amount and/or the distance between the mobile terminal and a human body. In this technical solution, the detected environmental data should be understood to comprise the detection of the temperature by the temperature sensor such as the absolute value and/or relative changes of temperature, the detection of the light by the photosensitive sensor such as whether the light exists or is strong or weak, the detection of the distance by the distance measuring sensor between the user and the mobile terminal, and any other data of the environment detected by the sensor within its working scope that can be used to detect the environment of the mobile terminal.

According to another aspect of the present invention, a method of displaying according to environmental data is provided, comprising: step 202, detecting the environment that a mobile terminal is in; and step 204, displaying corresponding control buttons according to detected environmental data. In this technical solution, the detection module detects and judges the environment of the mobile terminal, and the display module displays corresponding control buttons according to different environments, thereby avoiding users' misoperation.

In the above technical solution, preferably, in the step 202, the environment of the mobile terminal is detected through a sensor, and the sensor comprises a photosensitive sensor, a temperature sensor and/or a distance measuring sensor. In this technical solution, the sensor in the mobile terminal can comprise one or more than one of the photosensitive sensor, the temperature sensor, the distance measuring sensor and any other sensor that can be used for the detection of the environment of the mobile terminal.

In the above technical solution, preferably, the step 204 is specifically as follow: in the case that the environment of the mobile terminal detected by the sensor is that the mobile terminal is handheld by a user, when the mobile terminal receives a call, operation buttons are displayed, and in this situation, the user can conduct any operations such as answering or hanging off the call, without being limited; in the case that the environment of the mobile terminal detected by the sensor is that the mobile terminal is not handheld by a user, when the mobile terminal receives a call, information of the incoming call is displayed and the operation buttons are not displayed, in this situation, the user can see the information of the incoming call at the screen of the mobile terminal, while cannot conduct any operations such as answering or hanging off the call that may affect the incoming call. In this technical solution, the detection module detects and judges whether the mobile terminal is handheld by the user, and by way of limiting the operation buttons, the user is prevented from misoperating the mobile terminal when the mobile terminal is not handheld by the user.

In the above technical solution, preferably, the step 204 can specifically further comprise: in the case that the environment of the mobile terminal detected by the sensor is that the mobile terminal is handheld by a user, the unlock button is displayed after the screen of the mobile terminal is locked, in this situation, the user can unlock the mobile terminal or conduct any further operation without being limited; in the case that the environment of the mobile terminal detected by the sensor is that the mobile terminal is not handheld by a user, the unlock button is not displayed after the screen of the mobile terminal is locked, in this situation, the user cannot unlock the mobile terminal or conduct any further operation to avoid misoperation. In this technical solution, the detection module detects and judges whether the mobile terminal is handheld by the user, and by way of limiting the operation buttons, the user is prevented from misoperating the mobile terminal when the mobile terminal is not handheld by the user.

In the above technical solution, preferably, the environmental data can comprise temperature, light amount and/or the distance between the mobile terminal and a human body. In this technical solution, the detected environmental data should be understood to comprise the detection of the temperature by the temperature sensor such as the absolute value and/or relative changes of temperature, the detection of the light by the photosensitive sensor such as whether the light exists or is strong or weak, the detection of the distance by the distance measuring sensor between the user and the mobile terminal, and any other data of the environment detected by the sensor within its working scope that can be used to detect the environment of the mobile terminal.

DETAILED DESCRIPTION OF THE PRESENT INVENTION

To more clearly understand the above objects, features and advantages of the present invention, the present invention will be further detailed hereinafter in combination with the drawings and the specific embodiments.

Many details are described hereinafter for fully understanding the present invention, however, the present invention can also be implemented by embodiments other than those described herein, thus, the present invention is not restricted to or limited by the following specific embodiments.

Figure 1:
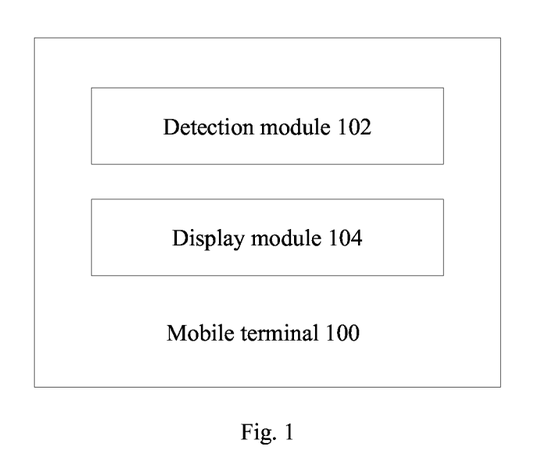
FIG. 1 is a block diagram of the mobile terminal according to the embodiment of the present invention.

FIG. 1 shows the block diagram of the mobile terminal according to the embodiment of the present invention.

As shown in FIG. 1, the mobile terminal 100 according to the embodiment of the present invention can comprise: a detection module 102 for detecting the environment that the mobile terminal is in; and a display module 104 for displaying corresponding control buttons according to detected environmental data. In this technical solution, the detection module 102 detects and judges the environments of the mobile terminal, and then the display module 104 displays corresponding control buttons according to different environments, thus avoiding users' misoperation.

In the above technical solution, the detection module 102 is specifically a sensor which comprises at least one of: a photosensitive sensor, a temperature sensor, and a distance measuring sensor. In this technical solution, the sensor in the mobile terminal 100 can comprise one or more than one of the photosensitive sensor, the temperature sensor, the distance measuring sensor and any other sensor that can be used for the detection of the environment of the mobile terminal.

In the above technical solution, in the case that the environment of the mobile terminal 100 detected by the detection module 102 is that the mobile terminal is handheld by a user, when the mobile terminal 100 receives a call, operation buttons are displayed, and in this situation, the user can conduct any operations such as answering or hanging off the call, without being limited; in the case that the environment of the mobile terminal 100 detected by the detection module 102 is that the mobile terminal is not handheld by a user, when the mobile terminal 100 receives a call, information of the incoming call is displayed and the operation buttons are not displayed, in this situation, the user can see the information of the incoming call at the screen of the mobile terminal 100, while cannot conduct any operations such as answering or hanging off the call that may affect the incoming call. In this technical solution, the detection module 102 detects and judges whether the mobile terminal 100 is handheld by the user, and by way of limiting the operation buttons, the user is prevented from misoperating the mobile terminal when the mobile terminal is not handheld by the user.

In the above technical solution, in the case that the environment of the mobile terminal 100 detected by the detection module 102 is that the mobile terminal is handheld by a user, the unlock button is displayed after the screen of the mobile terminal 100 is locked, in this situation, the user can unlock the mobile terminal 100 or conduct any further operation without being limited; in the case that the environment of the mobile terminal 100 detected by the detection module 102 is that the mobile terminal is not handheld by a user, the unlock button is not displayed after the screen of the mobile terminal 100 is locked, in this situation, the user cannot unlock the mobile terminal 100 or conduct any further operation to avoid misoperation. In this technical solution, the detection module 102 detects and judges whether the mobile terminal 100 is handheld by the user, and by way of limiting the operation buttons, the user is prevented from misoperating the mobile terminal 100 when the mobile terminal is not handheld by the user.

In the above technical solution, preferably, the mobile terminal may comprise a touch screen mobile phone, a touch screen tablet computer and etc.

When the above detection module 102 detects the environment of the mobile terminal 100, the detected environmental data can comprise temperature, light amount and/or the distance between the mobile terminal and a human body. In this technical solution, the detected environmental data should be understood to comprise the detection of the temperature by the temperature sensor such as the absolute value and/or relative changes of temperature, the detection of the light by the photosensitive sensor such as whether the light exists or is strong or weak, the detection of the distance by the distance measuring sensor between the user and the mobile terminal, for example, the distance between the mobile terminal and the human body, and any other data of the environment detected by the sensor within its working scope that can be used to detect the environment of the mobile terminal.

The above technical solution can avoid users' misoperation to the most extent.

Figure 2:
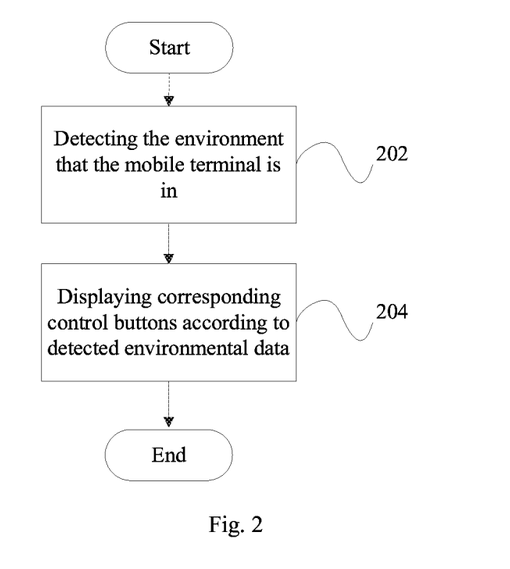
FIG. 2 is a flow chart of the method of displaying according to environmental data according to the embodiment of the present invention.

FIG. 2 shows a flow chart of the method of displaying according to the environmental data according to the embodiment of the present invention.

As shown in FIG. 2, according to another aspect of the present invention, a method of displaying according to environmental data is further provided, comprising: step 202, detecting the environment that a mobile terminal is in; and step 204, displaying corresponding control buttons according to detected environmental data. In this technical solution, the detection module detects and judges the environment of the mobile terminal, and the display module displays corresponding control buttons according to different environments, thereby avoiding users' misoperation.

According to the above technical solution, in step 202, the environment of the mobile terminal is detected through a sensor, and the sensor comprises a photosensitive sensor, a temperature sensor and/or a distance measuring sensor. In this technical solution, the sensor in the mobile terminal can comprise one or more than one of the photosensitive sensor, the temperature sensor, the distance measuring sensor and any other sensor that can be used for the detection of the environment of the mobile terminal.

In the above technical solution, the step 204 is specifically as follow: in the case that the environment of the mobile terminal detected by the sensor is that the mobile terminal is handheld by a user, when the mobile terminal receives a call, operation buttons are displayed, and in this situation, the user can conduct any operations such as answering or hanging off the call, without being limited; in the case that the environment of the mobile terminal detected by the sensor is that the mobile terminal is not handheld by a user, when the mobile terminal receives a call, information of the incoming call is displayed and the operation buttons are not displayed, in this situation, the user can see the information of the incoming call at the screen of the mobile terminal, while cannot conduct any operations such as answering or hanging off the call that may affect the incoming call. In this technical solution, the detection module detects and judges whether the mobile terminal is handheld by the user, and by way of limiting the operation buttons, the user is prevented from misoperating the mobile terminal when the mobile terminal is not handheld by the user.

In the above technical solution, the step 204 specifically further comprises: in the case that the environment of the mobile terminal detected by the sensor is that the mobile terminal is handheld by a user, the unlock button is displayed after the screen of the mobile terminal is locked, in this situation, the user can unlock the mobile terminal or conduct any further operation without being limited; in the case that the environment of the mobile terminal detected by the sensor is that the mobile terminal is not handheld by a user, the unlock button is not displayed after the screen of the mobile terminal is locked, in this situation, the user cannot unlock the mobile terminal or conduct any further operation to avoid misoperation. In this technical solution, the detection module detects and judges whether the mobile terminal is handheld by the user, and by way of limiting the operation buttons, the user is prevented from misoperating the mobile terminal when the mobile terminal is not handheld by the user.

In the above technical solution, the environmental data comprises temperature, light amount and/or the distance between the mobile terminal and a human body. In this technical solution, the detected environmental data should be understood to comprise the detection of the temperature by the temperature sensor such as the absolute value and/or relative changes of temperature, the detection of the light by the photosensitive sensor such as whether the light exists or is strong or weak, the detection of the distance by the distance measuring sensor between the user and the mobile terminal, and any other data of the environment detected by the sensor within its working scope that can be used to detect the environment of the mobile terminal.

The method of displaying according to environmental data according to the present invention will be described hereinafter by way of specific examples.

Figure 3:
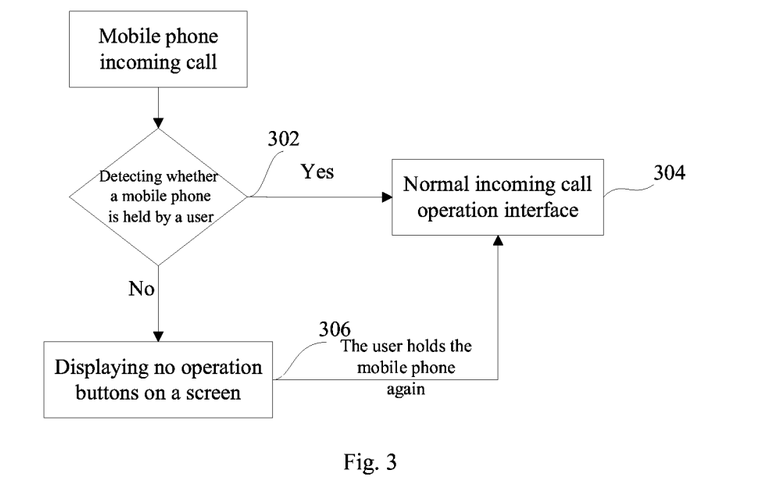
FIG. 3 is a flow chart of the method of displaying according to environmental data according to the embodiment of the present invention.

FIG. 3 shows a flow chart of the method of displaying according to the environmental data according to the embodiment of the present invention.

As shown in FIG. 3, when the mobile terminal, for example, a mobile phone, has an incoming call, the flow goes to step 302 in which whether the mobile phone is handheld by the user is detected, if it is handheld by the user, the flow goes to step 304, if it is not handheld by the user, the flow goes to step 306. Whether the mobile phone is handheld by the user can be conducted through a sensor, for example, the photosensitive sensor is used to detect the intensity of the light in the environment of the mobile phone, the temperature sensor is used to detect the temperature in the environment of the mobile phone, and when the light intensity becomes small and the temperature is low, it shows that the mobile phone is in the user's bag, then, when the user has an incoming call, only the information of the incoming call is displayed while the operation buttons are not displayed, thus the mobile phone will not be misoperated.

In step 304, the operation interface of a normal incoming call is displayed, as shown in FIGS. 4 and 5, the displayed information comprises the information of the incoming call (Wang Xiaodan and the number) and the operation buttons (control buttons such as the hang off button and the answer button), in this situation, the user can conduct any operations such as answering or hanging off the call without being limited.

Figure 6:
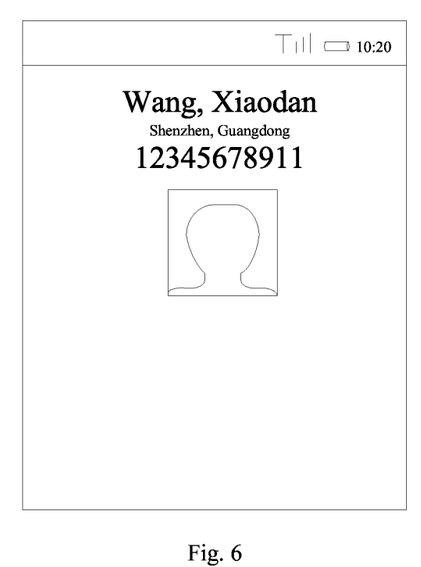
FIG. 6 is a schematic diagram of the display interface of an incoming call of the mobile phone that is not handheld according to the embodiment of the present invention.

In step 306, only the information of the incoming call is displayed in the screen and the operation buttons are not displayed, for example, as shown in FIG. 6, if the mobile phone is in a screen locked state when it receives an incoming call, the screen of the mobile phone only displays the name (Wang Xiaodan) and the number of the calling party, and does not display the slide answer control button or slide hang off control button or provide the operation buttons to the user. Likewise, when a mobile phone in a state that the screen is not locked receives an incoming call, the screen of the mobile phone only displays the name and the number of the calling party and does not display the control buttons such as the hang off and send message button, the hang off button and the answer button. In this situation, the user can see the information of the incoming call at the screen of the mobile phone, while cannot conduct any operations such as answering or hanging off the call that may affect the incoming call. In this technical solution, by way of detecting and judging whether the mobile terminal is handheld by the user, and by way of limiting the operation buttons, the user is prevented from misoperating the mobile terminal when the mobile terminal is not handheld by the user.

Figure 7:
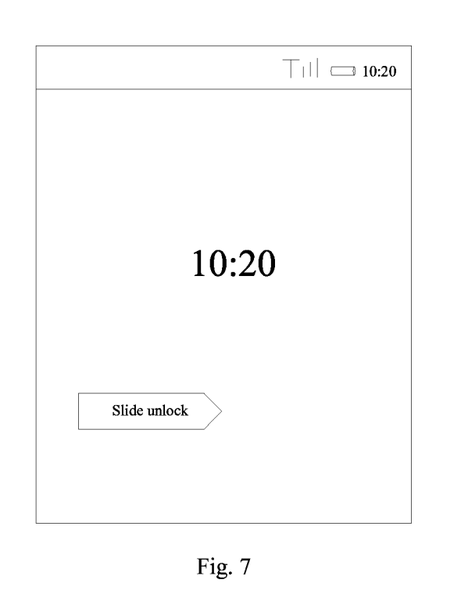
FIG. 7 is a schematic diagram of the unlock interface of the mobile phone that is handheld according to the embodiment of the present invention.
Figure 8:
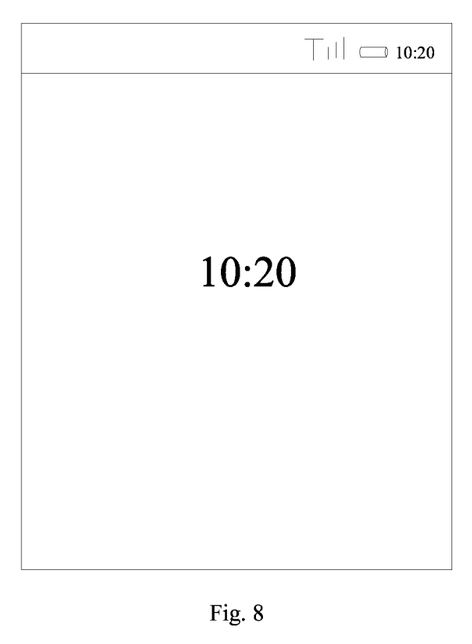
FIG. 8 is a schematic diagram of the display of the screen of the mobile phone that is not handheld when it is touched according to the embodiment of the present invention.

Still for example, when the mobile phone is in the screen locked state and it is detected that the mobile phone is not handheld by the user, the mobile phone enters a state of preventing misoperation, and when an object touches the mobile phone, the display screen does not display slide unlock control button and only displays standby information, as shown in FIG. 8, only the time information is displayed, and the slide unlock control button is not displayed. Therefore, when the user puts the mobile phone in the pocket, the situation will not occur that the slide unlock control button is touched unintentionally to unlock the mobile phone, and then the situation will not occur that the number of a contact person is dialled or an application is started, because the screen does not provide any control button for operation. When it is detected that the mobile phone is handheld by the user, the mobile phone quits the state of preventing misoperation and enters the normal state, when a finger touches the display screen, as shown in FIG. 7, the display screen displays not only the standby information (time information) but also the slide unlock control button for the user to unlock and then enter the home page of the mobile phone.

Therefore, whether the mobile phone is handheld by the user can be judged according to the detected environmental data, and when the mobile phone is away from the user's hands and is not handheld by the user, the mobile phone enters a state of preventing misoperation, if an incoming call is received in this state, the screen of the mobile phone does not display the control buttons such as the hang off or answer button, only when the user picks up the mobile phone again and the detection module detects that the environment of the mobile phone changes and judges that it is handheld by the user, the mobile phone quits the state of preventing misoperation, and when an incoming call is received, the screen of the mobile phone displays the control buttons such as the hang off or answer button, therefore, by way of dynamic arrangement of the control buttons, user's misoperation is avoided to the maximum extent.

Here, it should be understood that the mobile terminal in the embodiments can comprise all touch screen terminals, for example, touch screen tablet computer (iPad), and is not only limited to a touch screen mobile phone.

The technical solutions of the present invention are detailed hereinabove in combination with the drawings, and the control buttons are dynamically displayed according to the data of the environment of the mobile terminal, and misoperations are avoided to the maximum extent and a user-friendly design is provided.

Described above are just preferred embodiments of the present invention and are not intended to limit the present invention. For one skilled in the art, various modifications and changes can be made to the present invention, and any modifications, equivalent substitutions, improvements and etc. within the spirits and principles of the present invention should all be contained within the scope of protection of the present invention.

The invention claimed is:

1. A mobile terminal, comprising:
   a detection module for detecting environmental data of an environment that the mobile terminal is in; and
   a display module for displaying on a touch screen of the mobile terminal:
      corresponding control buttons according to detected environmental data; and
      information of a call received by the mobile terminal, wherein, if the environmental data of the mobile terminal detected by the detection module is that the mobile terminal is handheld by a user, when the mobile terminal receives a call, operation buttons are displayed on the touch screen by the display module; and
   if the environmental data of the mobile terminal detected by the detection module is that the mobile terminal is not handheld by a user, when the mobile terminal receives a call, the information of the call is displayed on the touch screen and operation buttons are not displayed on the touch screen by the display module.

2. The mobile terminal according to claim 1, wherein, the detection module is specifically a sensor which comprises at least one of: a photosensitive sensor, a temperature sensor, and a distance measuring sensor.

3. The mobile terminal according to claim 2, wherein, if the environmental data of the mobile terminal detected by the detection module is that the mobile terminal is handheld by a user, an unlock button is displayed on the touch screen of the mobile terminal after the screen of the mobile terminal is locked; and
   if the environmental data of the mobile terminal detected by the detection module is that the mobile terminal is not handheld by a user, the unlock button is not displayed on the touch screen of the mobile terminal after the screen of the mobile terminal is locked.

4. The mobile terminal according to claim 2, wherein, the mobile terminal is one of a touch screen mobile phone and a touch screen tablet computer.

5. The mobile terminal according to claim 2 wherein the sensor comprises at least one of: a photosensitive sensor and a temperature sensor.

6. The mobile terminal according to claim 1, wherein, if the environmental data of the mobile terminal detected by the detection module is that the mobile terminal is handheld by a user, an unlock button is displayed on the touch screen after the screen of the mobile terminal is locked; and
if the environmental data of the mobile terminal detected by the detection module is that the mobile terminal is not handheld by a user, the unlock button is not displayed on the touch screen after the screen of the mobile terminal is locked.

7. The mobile terminal according to claim 1, wherein, the mobile terminal is one of a touch screen mobile phone and a touch screen tablet computer.

8. The mobile terminal according to claim 1, wherein the environmental data comprises temperature and/or light intensity.

9. The mobile terminal according to claim 8, wherein if the environmental data of the mobile terminal detected by the detection module is that the mobile terminal is in a bag, when the mobile terminal receives a call, the information of the call is displayed on the touch screen and operation buttons are not displayed on the touch screen by the display module.

10. A method of displaying according to environmental data, comprising:
detecting environmental data of an environment that a mobile terminal is in; and
displaying on a touch screen of the mobile terminal:
corresponding control buttons according to detected environmental data; and
information of a call received by the mobile terminal,
wherein the environmental data is detected through a sensor, and
wherein, the displaying step comprises:
if the environmental data of the mobile terminal detected by the sensor is that the mobile terminal is handheld by a user, when the mobile terminal receives a call, operation buttons are displayed on the touch screen; and
if the environmental data of the mobile terminal detected by the sensor is that the mobile terminal is not handheld by a user, when the mobile terminal receives a call, the information of the call is displayed on the touch screen and operation buttons are not displayed on the touch screen.

11. The method of displaying according to environmental data according to claim 10, wherein the sensor comprises at least one of a photosensitive sensor, and a temperature sensor and a distance measuring sensor.

12. The method of displaying according to environmental data according to claim 11, wherein, the displaying step further comprises the following:
if the environmental data of the mobile terminal detected by the sensor is that the mobile terminal is handheld by a user, an unlock button is displayed on the touch screen after the screen of the mobile terminal is locked; and
if the environmental data of the mobile terminal detected by the sensor is that the mobile terminal is not handheld by a user, the unlock button is not displayed on the touch screen after the screen of the mobile terminal is locked.

13. The method of displaying according to environmental data according to claim 11, wherein, the environmental data comprises: temperature, light amount and/or the distance between the mobile terminal and a human body.

14. The method of displaying according to environmental data according to claim 10, wherein, the displaying step further comprises the following:
if the environmental data of the mobile terminal detected by the sensor is that the mobile terminal is handheld by a user, an unlock button is displayed on the touch screen after the screen of the mobile terminal is locked; and
if the environmental data of the mobile terminal detected by the sensor is that the mobile terminal is not handheld by a user, the unlock button is not displayed on the touch screen after the screen of the mobile terminal is locked.

15. The method of displaying according to environmental data according to claim 10, wherein, the environmental data comprises: temperature and/or light amount.

16. The method of displaying according to claim 15, wherein if the environmental data of the mobile terminal detected by the sensor is that the mobile terminal is in a bag, when the mobile terminal receives a call, the information of the call is displayed on the touch screen and operation buttons are not displayed on the touch screen.

17. The method of displaying according to claim 15, wherein the detecting comprises detecting an absolute temperature.

18. The method of displaying according to claim 15, wherein the detecting comprises detecting a relative change in temperature.

* * * * *